Jan. 13, 1931.  L. R. NELSON  1,788,492
SPRINKLER NOZZLE
Filed July 19, 1928
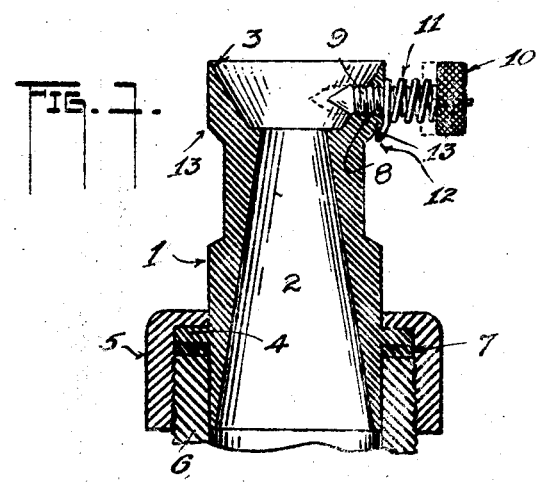
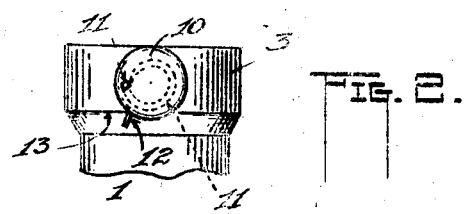
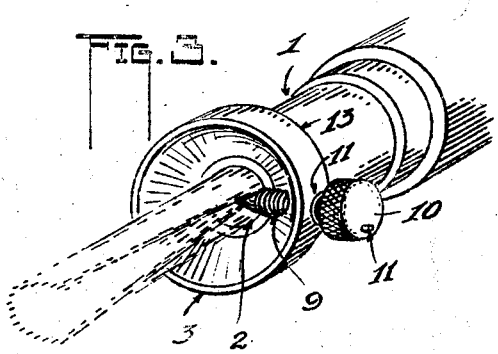
Inventor
L. R. Nelson Patented Jan. 13, 1931

1,788,492

UNITED STATES PATENT OFFICE

LEWEN R. NELSON, OF PEORIA, ILLINOIS

SPRINKLER NOZZLE

Application filed July 19, 1928. Serial No. 293,888.

This invention relates to sprinkler nozzles adaptable for use on garden hose and upon rotating lawn and golf-course sprinklers.

An object of the invention is to provide in a nozzle a novel arrangement to be moved into the water stream issuing from the nozzle to thereby create a spray.

Another object is to furnish a nozzle with a part beyond or outside the outlet for the water-stream adapted to be adjusted to fixed positions and to be moved into said stream as it issues from said outlet to thereby create a spray, which, especially when used with a whirling or rotating sprinkler, will cover a considerable amount of territory.

Another object is to extend a screw through a part of the nozzle outward from the discharge opening for the water stream, and to provide for adjusting the same in the direction of the axis of the outlet whereby to intercept the water stream and break it up into a spray.

Further, an object is to provide a novel form of means for fixing the screw in any adjusted position.

Besides these objects the invention lies in certain novel arrangements of parts to form the basis for certain of the claims to follow herein.

In the appended drawing which shows a preferred form of my invention,

Figure 1 is a longitudinal section of a nozzle showing my invention in connection therewith.

Figure 2 is a side elevation of a portion of the nozzle, and

Figure 3 illustrates the nozzle in perspective showing my invention and the effect produced upon a water stream.

The drawing illustrates a nozzle of an approved form for attachment to a hose or to any rotating type of sprinkler, and embraces a body 1 having a bore 2, said body also having an extended portion 3 at its discharge end or beyond its outlet for the water stream.

The body may have any convenient means for its attachment to a hose or a sprinkler, neither of the latter being shown. Said body may include a flange 4 as an integral part over which may be placed an internally threaded nut 5 to engage a fitting 6 as part of a hose or sprinkler, as the case may be, with a rubber washer 7 interposed in the usual way.

The extended portion 3 at the free end of the nozzle is provided with a threaded bore 8 which in this instance lies at right angles to the axis of the bore 2 and its axis may pass through that of the said bore.

A screw 9 is provided to engage the threads of the bore 8 and may be preferably pointed at its inner end while being provided at its outer end with a knurled head 10, for example, by which it may be readily turned by the fingers of the hand. A coil spring 11 surrounds the stem of the screw and is compressed by bearing at its ends against the head 10 and the body of the nozzle. One of said ends extends through the head 10 while the other end terminates in a slight lateral bend at 12 adapted to engage beneath a corner 13, which I shall term an abutment, created by reducing the nozzle's diameter in substantially the manner shown, this method being shown merely as an example.

The office of the spring is to furnish means for positively securing the screw in any desired adjustment and by which, also, vibrations of the nozzle cannot result in the screw changing its position in the least. That is to say, since the spring is held under compression between the said head and the said body the end 12 will be retained below the corner 13. At the same time since the other end of the spring is held in the head a turning movement of the latter in adjusting the screw will cause the end 12 to be drawn over the corner 13, free thereof, which will then follow around with said screw until upon reaching said corner will drop below it and again sustain the screw in position. Therefore, no matter in what position the screw may be left it will be positively held whenever the described relation of the end 12 and corner 13 obtains.

The water issuing from the bore 2 unless intercepted is, of course, a full round stream. But when the screw is turned to move its point into said stream the form of the latter will be changed, being broken into a spray which appears somewhat as shown in Figure 3, the effect being just in the degree to which the screw may be advanced.

The yieldable spring by frictionally engaging at one end an abutment answers as a very efficient holding means and takes the place of any such device as a lock-nut, for example, which would be difficult to handle. The simple screw takes the place of a heavy and cumbersome means for accomplishing the purpose and that might be detrimental to the free and proper operation of a sprinkler of the rotating type. But while I have shown and described a member that is screw-threaded to provide for a nice adjustment it is to be understood that I may employ any other member the equivalent of the screw.

Again while the abutment 13 is described and shown as a part to be engaged by the end of the spring 11 an abutment may be otherwise provided and otherwise placed since it is broadly the purpose to furnish any type of control to provide for holding the screw in a given adjusted position while permitting adjustments of said screw by manual effort.

Moreover, while one end of the spring in this instance extends into or through the head 10 of the screw, it may be so held at either end while the remaining end is free to drag frictionally with respect to the part adjacent which it lies, still having the same control of the screw as required.

I claim:

1. In combination, a sprinkler nozzle having an extension projecting laterally at its discharge end creating an abutment, a screw adjustably mounted in the extension substantially at right angles to the bore of the said nozzle adapted at one end to intercept a water stream issuing from said bore, and a spring encircling the screw at one end outside the abutment and at one end fixed with respect to the screw, the other end of the spring being free and terminating in a lateral extension to engage the said abutment, said free end adapted to rotate with the screw but normally frictionally engaging said abutment for maintaining the screw in a fixed position.

2. In combination, a sprinkler nozzle having a conical bore through which to discharge a water stream at its smallest diameter, said nozzle outward from the bore having an extension provided with a conical bore of larger diameter than the smallest diameter of the first named bore and communicating with the latter, said extension having an abutment on its outer surface, a screw mounted in the extension at right angles to the axes of the bores adapted for adjustment toward said axes, and a spiral spring fixed at one end to the screw and at its other end terminating in a laterally directed extension to frictionally engage beneath the abutment for normally holding the screw in fixed adjustment but adapted to disengage from the latter in a manual adjustment of said screw.

3. In combination, a sprinkler nozzle, a screw extending through the wall of the same adapted to intercept a water stream issuing from the nozzle's bore, and a spring coiled upon the screw, one end engaging said screw, the other end engaging the nozzle, and one end being fixed with respect to one of them, the other end adapted to frictionally engage the other of the described parts normally preventing free movement of the screw but permitting adjustment of the latter manually, said spring and the part thus frictionally engaging adapted to have movement relatively during such manual adjustment.

4. In combination, a sprinkler nozzle including an extension projecting beyond the discharge orifice of said nozzle, a screw adjustably mounted in said extension substantially at right angles to the bore of said nozzle and adapted to project toward the axis of said nozzle and intersect the projected bore of the discharge orifice, and a spring arranged to encircle said screw between said extension and the head of said screw, one end of said spring being fixed in relation to the said screw and the other end being arranged to frictionally engage said extension and to rotate with said screw upon adjustment thereof.

5. In combination, a sprinkler nozzle including a main body with a bore having a diameter decreasing toward the discharge orifice and increasing beyond said orifice, including a lateral extension beyond said orifice and a tapered spray controlling means adjustably mounted in said extension and adapted to project substantially at right angles into the projected bore of said discharge orifice and resilient means including a spiral spring encircling said spray controlling member and fixedly attached thereto at one end and frictionally engaging said lateral extension in resilient locking relation at the other end.

6. In combination, a sprinkler nozzle including a main body with a bore having a diameter decreasing toward the discharge orifice and increasing beyond said orifice, including a lateral extension beyond said orifice, and a screw adjustably mounted in said extension substantially at right angles to the axis of said bore, and a spiral spring encircling said screw and fixed at one end to the head of said screw and having the other end free to frictionally engage said extension and movable with respect thereto.

In testimony whereof I affix my signature.

LEWEN R. NELSON.